United States Patent
Beon et al.

(10) Patent No.: US 12,276,882 B2
(45) Date of Patent: Apr. 15, 2025

(54) DISPLAY DEVICE

(71) Applicant: Samsung Display Co., LTD., Yongin-si (KR)

(72) Inventors: Beong-Hun Beon, Yongin-si (KR); Dukjin Lee, Yongin-si (KR); Woosuk Jung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/623,343

(22) Filed: Apr. 1, 2024

(65) Prior Publication Data

US 2025/0028204 A1    Jan. 23, 2025

(30) Foreign Application Priority Data

Jul. 19, 2023   (KR) ........................ 10-2023-0093651

(51) Int. Cl.
*G02F 1/13363* (2006.01)
*G02F 1/1335* (2006.01)

(52) U.S. Cl.
CPC .. *G02F 1/133637* (2021.01); *G02F 1/133528* (2013.01); *G02F 1/133633* (2021.01); *G02F 1/133638* (2021.01)

(58) Field of Classification Search
None
See application file for complete search history.

(56) References Cited

U.S. PATENT DOCUMENTS

| | | | |
|---|---|---|---|
| 10,394,040 B2 | 8/2019 | Gollier et al. | |
| 10,401,630 B2 | 9/2019 | Sulai et al. | |
| 10,495,798 B1 | 12/2019 | Peng et al. | |
| 10,495,887 B1 | 12/2019 | Sulai et al. | |
| 10,578,873 B2 | 3/2020 | Lee et al. | |
| 10,642,048 B2 | 5/2020 | Peng et al. | |
| 10,670,861 B2 | 6/2020 | Gollier | |
| 10,816,795 B2 | 10/2020 | Kessler et al. | |
| 10,816,807 B2 | 10/2020 | Polcak et al. | |
| 10,890,776 B1 | 1/2021 | Gao et al. | |
| 10,935,797 B1 | 3/2021 | Sulai et al. | |
| 10,955,672 B1 | 3/2021 | Wheelwright et al. | |
| 11,002,898 B2 | 5/2021 | Peng et al. | |

(Continued)

FOREIGN PATENT DOCUMENTS

| | | | | |
|---|---|---|---|---|
| CN | 116009256 A | * | 4/2023 | ........... G02B 27/144 |
| WO | 2015122387 A1 | | 8/2015 | |

OTHER PUBLICATIONS

Extended European Search Report mailed Nov. 29, 2024 in EP Application No. 24180415.2, 12 pages.

*Primary Examiner* — Phu Vu

(74) *Attorney, Agent, or Firm* — CANTOR COLBURN LLP

(57) ABSTRACT

A display device includes a display panel and an optical panel disposed on the display panel, the display panel includes a light-emitting device part including a light-emitting device, a first phase retardation layer disposed on the light-emitting device part and having reverse wavelength dispersion characteristics, and an absorbing polarizer disposed on the first phase retardation layer, and the optical panel includes a first lens part disposed on the display panel and including a beam splitter and a second lens part disposed on the first lens part and including a reflective polarizer.

23 Claims, 11 Drawing Sheets

(56) References Cited

U.S. PATENT DOCUMENTS

| | | |
|---|---|---|
| 11,002,955 B2 | 5/2021 | Sharp et al. |
| 11,022,784 B1 | 6/2021 | Wheelwright et al. |
| 11,054,622 B1 | 7/2021 | Gollier et al. |
| 11,112,601 B2 | 9/2021 | Sharp |
| 11,156,755 B2 | 10/2021 | Levin et al. |
| 11,156,814 B2 | 10/2021 | Steiner et al. |
| 11,226,482 B2 | 1/2022 | Sharp |
| 11,226,483 B2 | 1/2022 | Sharp |
| 11,249,355 B2 | 2/2022 | Sharp |
| 11,262,565 B2 | 3/2022 | Etter et al. |
| 11,269,123 B2 | 3/2022 | Sharp et al. |
| 11,294,113 B2 | 4/2022 | Sharp |
| 11,320,665 B2 | 5/2022 | Sharp |
| 11,340,451 B2 | 5/2022 | Kessler et al. |
| 11,366,311 B2 | 6/2022 | Imamura et al. |
| 11,372,239 B1 | 6/2022 | Sulai et al. |
| 11,422,409 B2 | 8/2022 | Gollier et al. |
| 11,487,120 B2 | 11/2022 | Hudman |
| 11,493,773 B2 | 11/2022 | Kelly |
| 11,500,211 B2 | 11/2022 | Komura et al. |
| 11,543,669 B2 | 1/2023 | Sharp et al. |
| 2007/0206282 A1 | 9/2007 | Miyatake et al. |
| 2007/0243340 A1 | 10/2007 | Umemoto et al. |
| 2010/0222534 A1 | 9/2010 | Adlem et al. |
| 2012/0224245 A1 | 9/2012 | Adlem et al. |
| 2015/0260903 A1* | 9/2015 | Kashima .............. G02B 6/0056 359/489.07 |
| 2021/0278582 A1 | 9/2021 | Wang et al. |
| 2023/0129724 A1 | 4/2023 | Lee et al. |

\* cited by examiner

DISPLAY DEVICE

This application claims priority to Korean Patent Application No. 10-2023-0093651, filed on Jul. 19, 2023, and all the benefits accruing therefrom under 35 U.S.C. § 119, the content of which in its entirety is herein incorporated by reference.

BACKGROUND

1. Field

The disclosure relates to a display device. More specifically, the disclosure relates to a head-mounted display device.

2. Description of the Related Art

As information technology develops, the importance of a display device as a connection medium between a user and information is being highlighted. For example, the use of display devices such as the like a liquid crystal display device ("LCD"), an organic light-emitting display device ("OLED"), a plasma display device ("PDP"), a quantum dot display device is increasing.

The display device is included and used in various electronic devices, and recently, a head-mounted display device that is placed directly in front of the user's eyes and displays an image to provide the user with a three-dimensional effect or sense of immersion is also becoming widely popular.

SUMMARY

Embodiments provide a display device with improved display quality.

A display device in an embodiment includes a display panel and an optical panel disposed on the display panel, the display panel includes a light-emitting device part including at least one light-emitting device, a first phase retardation layer disposed on the light-emitting device part and having reverse wavelength dispersion characteristics, and an absorbing polarizer disposed on the first phase retardation layer, and the optical panel includes a first lens part disposed on the display panel and including a beam splitter and a second lens part disposed on the first lens part and including a reflective polarizer.

In an embodiment, the first phase retardation layer may include at least one of a reverse wavelength dispersion film and a reverse wavelength dispersion liquid crystal.

In an embodiment, the reverse wavelength dispersion film included in the first phase retardation layer may be a film in which a first polymer having positive birefringence and a second polymer having negative birefringence are mixed.

In an embodiment, the reverse wavelength dispersion liquid crystal included in the first phase retardation layer may be a liquid crystal in which a normal dispersion mesogen and an inverse dispersion mesogen are mixed.

In an embodiment, the first phase retardation layer may have a structure in which two or more phase retardation layers having different retardation axes are sequentially stacked.

In an embodiment, the absorbing polarizer of the display panel may have a light absorption axis, absorb polarized light of the light absorption axis, and transmit polarized light perpendicular to the light absorption axis, and the reflective polarizer of the second lens part may have a reflection axis, reflect polarized light of the reflection axis, and transmit polarized light perpendicular to the reflection axis.

In an embodiment, the light absorption axis and the reflection axis may have a same direction as each other.

In an embodiment, the first phase retardation layer may have a first retardation axis, retardate light in a direction of the first retardation axis by λ/4 and change linearly polarized light to circularly polarized light or change circularly polarized light to linearly polarized light.

In an embodiment, the display panel may further include a second phase retardation layer disposed on the absorbing polarizer, having a second retardation axis, retardates light in a direction of the second retardation axis by λ/4 and change linearly polarized light to circularly polarized light or change circularly polarized light to linearly polarized light.

In an embodiment, the light-emitting device may include a pixel electrode, a light-emitting layer disposed on the pixel electrode, and a common electrode disposed on the light-emitting layer, the common electrode may reflect some of an incident light, and a light reflected from the common electrode may transmit through the first phase retardation layer and be absorbed by the absorbing polarizer.

In an embodiment, a separate polarizer may be not disposed between the first phase retardation layer and the absorbing polarizer.

A display device in an embodiment includes a display panel and an optical panel disposed on the display panel, the display panel includes a light-emitting device part including at least one light-emitting device, a first phase retardation layer disposed on the light-emitting device part and having reverse wavelength dispersion characteristics, a first absorbing polarizer disposed on the first phase retardation layer, and a reflective polarizer disposed on the first absorbing polarizer, and the optical panel includes a first lens part disposed on the display panel and including a beam splitter, and a second lens part disposed on the first lens part and including a second absorbing polarizer.

In an embodiment, the first phase retardation layer may include at least one of a reverse wavelength dispersion film and a reverse wavelength dispersion liquid crystal.

In an embodiment, the reverse wavelength dispersion film included in the first phase retardation layer may be a film in which a first polymer having positive birefringence and a second polymer having negative birefringence are mixed.

In an embodiment, the reverse wavelength dispersion liquid crystal included in the first phase retardation layer may be a liquid crystal in which a normal dispersion mesogen and an inverse dispersion mesogen are mixed.

In an embodiment, the first phase retardation layer may have a structure in which two or more phase retardation layers having different retardation axes are sequentially stacked.

In an embodiment, the first absorbing polarizer of the display panel may have a first light absorption axis, absorb polarized light of the first light absorption axis, and transmit polarized light perpendicular to the first light absorption axis, the reflective polarizer of the display panel may have a reflection axis, reflect polarized light of the reflection axis, and transmit polarized light perpendicular to the reflection axis, and the second absorbing polarizer of the second lens part may have a second light absorption axis, absorb polarized light of the second light absorption axis, and transmit polarized light perpendicular to the second light absorption axis.

In an embodiment, the first light absorption axis, the reflection axis, and the second light absorption axis may have a same direction as each other.

In an embodiment, the first phase retardation layer may have a first retardation axis, retardates light in a direction of the first retardation axis by λ/4 and change linearly polarized light to circularly polarized light or change circularly polarized light to linearly polarized light.

In an embodiment, the display panel may further include a second phase retardation layer disposed on the first absorbing polarizer, having a second retardation axis, retardates light in a direction of the second retardation axis by λ/4, change linearly polarized light to circularly polarized light or change circularly polarized light to linearly polarized light.

In an embodiment, the light-emitting device may include a pixel electrode, a light-emitting layer disposed on the pixel electrode, and a common electrode disposed on the light-emitting layer, the common electrode may reflect some of an incident light, and a light reflected from the common electrode may transmit through the first phase retardation layer and be absorbed by the first absorbing polarizer.

In an embodiment, the light-emitting device part, the first phase retardation layer, the first absorbing polarizer, and the reflective polarizer may be sequentially stacked.

In an embodiment, a separate polarizer may be not disposed between the first phase retardation layer and the first absorbing polarizer.

The display device in embodiments may include a display panel and an optical panel disposed in front of the display panel, and light emitted from the display panel may be bent (e.g., refracted) by lens included in the optical panel and then reach the user. Accordingly, the user may view an image larger than a size of the display panel. Accordingly, a degree to which the user is immersed in the image may be improved, and three-dimensional effect of the image may also be improved.

Additionally, the display panel may have a structure in which a light-emitting device part, a phase retardation layer having reverse wavelength dispersion characteristics, and an absorbing polarizer are sequentially stacked. Accordingly, light reflected from a common electrode of the display panel may be absorbed by the absorbing polarizer and be lost. Accordingly, light reflected from the common electrode of the display panel may not be substantially visible to the user. Accordingly, an occurrence of virtual images due to reflection of the common electrode may be reduced or prevented.

It is to be understood that both the foregoing general description and the following detailed description are exemplary and explanatory and are intended to provide further explanation of the invention as claimed.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
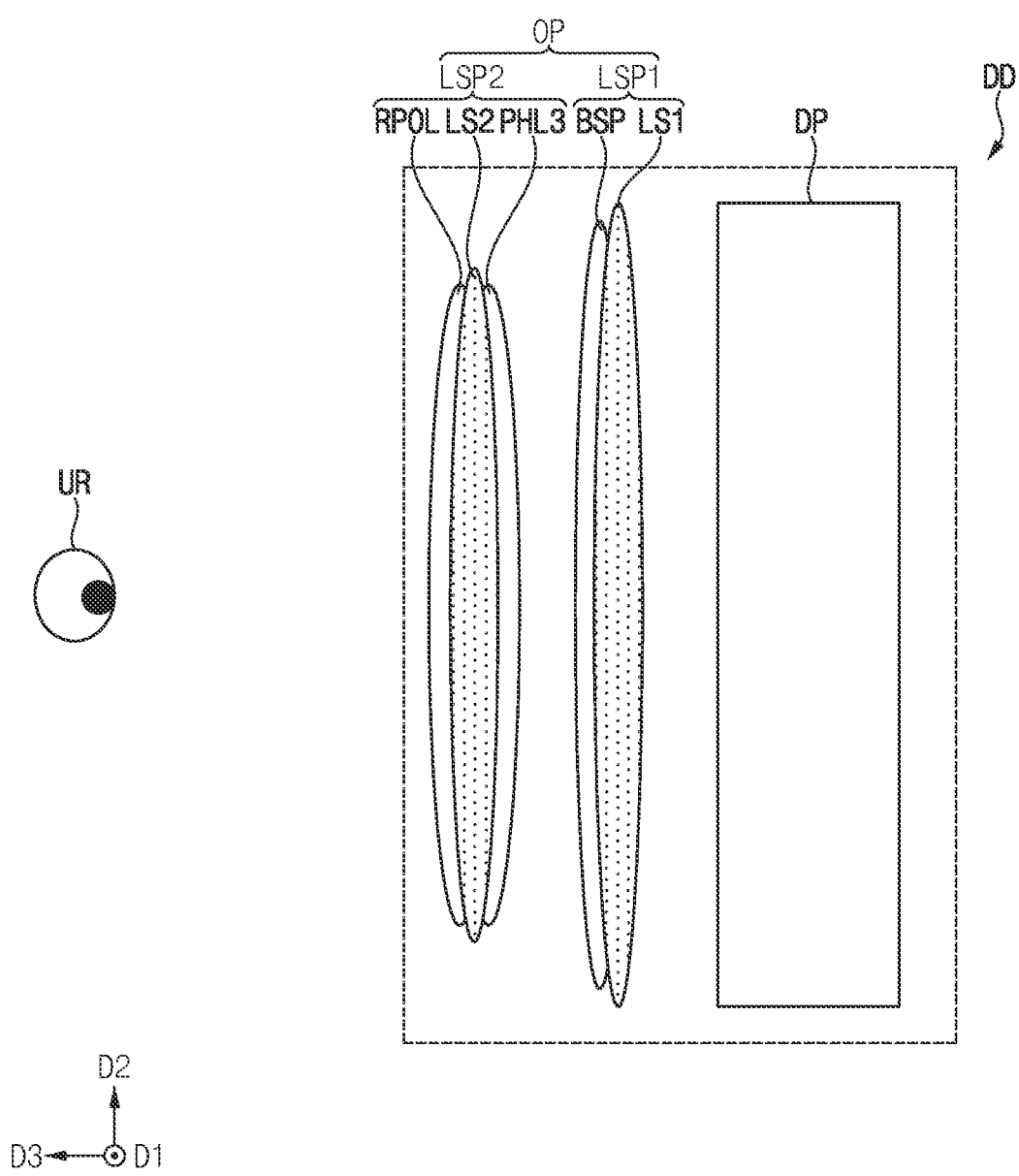
FIG. 1 is a schematic diagram illustrating an embodiment of a display device.

Embodiments of the disclosure now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within +30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a schematic diagram illustrating an embodiment of a display device.

Referring to FIG. 1, a display device DD may include a display panel DP and an optical panel OP. The optical panel OP may be disposed in front of the display panel DP. In an embodiment, the optical panel OP may be disposed between the display panel DP and a user UR (e.g., eyes of the user UR), for example. That is, on a plane defined by a first direction D1 and a second direction D2 which are perpendicular to each other, the display panel DP and the optical panel OP may be aligned sequentially along a third direction D3 which is a normal direction of the plane. The optical panel OP may improve a sense of immersion or three-dimensional effect by making light emitted from the display panel DP appear wider.

Figure 2:
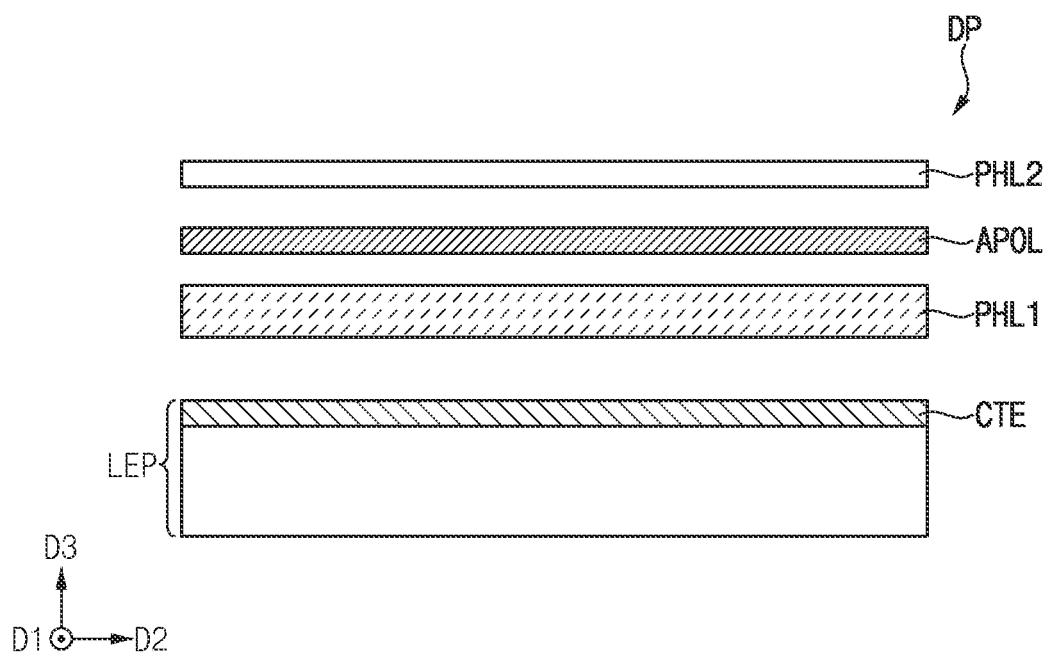
FIG. 2 is a schematic cross-sectional view illustrating a display panel included in the display device of FIG. 1.

FIG. 2 is a schematic cross-sectional view illustrating a display panel included in the display device of FIG. 1.

Referring to FIG. 2, the display panel DP may be a self-luminous display panel that emits light on its own. In an embodiment, the display panel DP may include an organic light-emitting device ("OLED"), an inorganic light-emitting device ("ILED"), or the like, for example. Hereinafter, the description will focus on an embodiment in which the display panel DP includes an organic light-emitting device ("OLED"). FIG. 2 schematically illustrates a light-emitting device part LEP included in the display panel DP. The light-emitting device part LEP may include a plurality of layers of the display panel DP in which a light-emitting device that emits light and a pixel circuit for driving the light-emitting device are formed. A common electrode CTE of the light-emitting device may be disposed at the uppermost part of the light-emitting device part LEP. Accordingly, in FIG. 2, only the common electrode CTE of the light-emitting device part LEP is illustrated in detail, and the detailed cross-sectional structure of the light-emitting device part LEP will be described in more detail later with reference to FIG. 4.

A first phase retardation layer PHL1, an absorbing polarizer APOL, and a second phase retardation layer PHL2 may be sequentially disposed on the light-emitting device part LEP. In an embodiment, a separate polarizer may not be disposed between the first phase retardation layer PHL1 and the absorbing polarizer APOL. That is, light-transmitting through the first phase retardation layer PHL1 may reach the absorbing polarizer APOL without passing through a separate optical structure.

The first phase retardation layer PHL1 may have a first retardation axis and provide a phase difference of $\lambda/4$ with respect to the first retardation axis. Accordingly, the first phase retardation layer PHL1 may retardate light in a direction of the first retardation axis by $\lambda/4$ to change linearly polarized light to circularly polarized light or change circularly polarized light to linearly polarized light. The first phase retardation layer PHL1 may have reverse wavelength dispersion characteristics.

In an embodiment, the first phase retardation layer PHL1 may include a reverse wavelength dispersion film. In an embodiment, the reverse wavelength dispersion film may be a film in which a first polymer having positive birefringence and a second polymer having negative birefringence are mixed, for example. In an embodiment, the first phase retardation layer PHL1 may be formed by blending the first polymer and the second polymer to produce an unstretched film, winding the unstretched film into a roll, and then stretching the unstretched film wound around the roll, for example.

Embodiments of the disclosure should not be construed as being limited to the embodiments set forth herein. Rather, these embodiments are provided so that this disclosure will be thorough and complete and will fully convey the concept of the invention to those skilled in the art.

In embodiments, the first polymer may include cyclo-olefin polymer, polycarbonate ("PC"), polyethylene terephthalate ("PET"), cellulose-based polymer, or the like. These may be used alone or in any combinations with each other.

In embodiments, the second polymer may include polystyrene, polyacrylate, polycarbonate, acrylate-styrene copolymer, or the like. These may be used alone or in any combinations with each other.

In an embodiment, the first phase retardation layer PHL1 may include reverse wavelength dispersion liquid crystal. In an embodiment, the reverse wavelength dispersion liquid crystal may be a liquid crystal in which a normal dispersion mesogen and an inverse dispersion mesogen are mixed, for example.

In an embodiment, the first phase retardation layer PHL1 may have a single-layer structure. That is, the first phase retardation layer PHL1 may be a single-layer reverse wavelength dispersion film or a single-layer reverse wavelength dispersion liquid crystal.

In another embodiment, the first phase retardation layer PHL1 may have a multi-layer structure. In an embodiment, the first phase retardation layer PHL1 may have a structure in which two or more phase retardation layers having different retardation axes are sequentially stacked, for example. The first phase retardation layer PHL1 may have a structure in which two or more reverse wavelength dispersion films are sequentially stacked. Additionally, the first phase retardation layer PHL1 may have a structure in which two or more reverse wavelength dispersion liquid crystals are sequentially stacked. Additionally, the first phase retardation layer PHL1 may have a structure including at least one reverse wavelength dispersion film and at least one reverse wavelength dispersion liquid crystal.

As the first phase retardation layer PHL1 may have reverse wavelength dispersion characteristics, regardless of a wavelength band of light emitted from the light-emitting device part LEP, the first phase retardation layer PHL1 may provide a phase difference of $\lambda/4$ with respect to the first retardation axis. Accordingly, the first phase retardation layer PHL1 may function as a phase retardation layer for light of various wavelength bands.

The absorbing polarizer APOL may have a light absorption axis. The absorbing polarizer APOL may absorb linearly polarized light in the same direction as the absorption axis. That is, linearly polarized light in the same direction as the light absorption axis may not transmit through the absorbing polarizer APOL. Additionally, the absorbing polarizer APOL may transmit linearly polarized light perpendicular to the absorption axis. That is, the absorbing polarizer APOL may have a transmission axis perpendicular to the light absorption axis.

The second phase retardation layer PHL2 may have a second retardation axis and provide a phase difference of $\lambda/4$ with respect to the second retardation axis. Accordingly, the second phase retardation layer PHL2 may retardate light in a direction of the second retardation axis by $\lambda/4$ to change linearly polarized light to circularly polarized light or change circularly polarized light to linearly polarized light.

Referring back to FIG. 1, the optical panel OP may include a first lens part LSP1 and a second lens part LSP2. The first lens part LSP1 may include a first lens LS1 and a beam splitter BSP. The second lens part LSP2 may include a second lens LS2, a third phase retardation layer PHL3, and a reflective polarizer RPOL.

The first lens LS1 and the second lens LS2 may be curved lenses. A curved surface of each of the first lens LS1 and the second lens LS2 may be spherical or aspherical. In FIG. 1, opposite sides of the first lens LS1 are illustrated as being convex, but a shape of the first lens LS1 is not necessarily limited to this. Each of the first lens LS1 and the second lens LS2 may include an optically isotropic material. In an embodiment, each of the first lens LS1 and the second lens LS2 may include glass, polymethyl methacrylate ("PMMA"), or the like, for example.

The beam splitter BSP may be disposed on one side of the first lens LS1. In an embodiment, the beam splitter BSP may be disposed on the user UR side of the first lens LS1, for example. However, the invention is not necessarily limited to this, and the beam splitter BSP may be disposed on the display panel DP side of the first lens LS1.

The beam splitter BSP may transmit some of the incident light and reflect the other of the incident light. The beam splitter BSP may reflect and transmit light regardless of polarization characteristics of light.

The third phase retardation layer PHL3 may be disposed on one side of the second lens LS2. In an embodiment, the third phase retardation layer PHL3 may be disposed on the first lens part LSP1 side of the second lens LS2, for example. The third phase retardation layer PHL3 may have a third retardation axis and provide a phase difference of $\lambda/4$ with respect to the third retardation axis. Accordingly, the third phase retardation layer PHL3 may retardate light in a direction of the third retardation axis by $\lambda/4$ to change linearly polarized light to circularly polarized light or change circularly polarized light to linearly polarized light.

The reflective polarizer RPOL may be disposed on the other side of the second lens LS2. In an embodiment, the reflective polarizer RPOL may be disposed on the user UR side of the second lens LS2, for example. The reflective polarizer RPOL may have a reflection axis. The reflective polarizer RPOL may reflect linearly polarized light in the same direction as the reflection axis. That is, linearly polarized light in the same direction as the reflection axis may not transmit through the reflective polarizer RPOL. Additionally, the reflective polarizer RPOL may transmit linearly polarized light perpendicular to the reflection axis. That is, the reflective polarizer RPOL may have a transmission axis perpendicular to the reflection axis.

In an embodiment, the light absorption axis of the absorbing polarizer APOL and the reflection axis of the reflective polarizer RPOL may have the same direction as each other.

Figure 3:
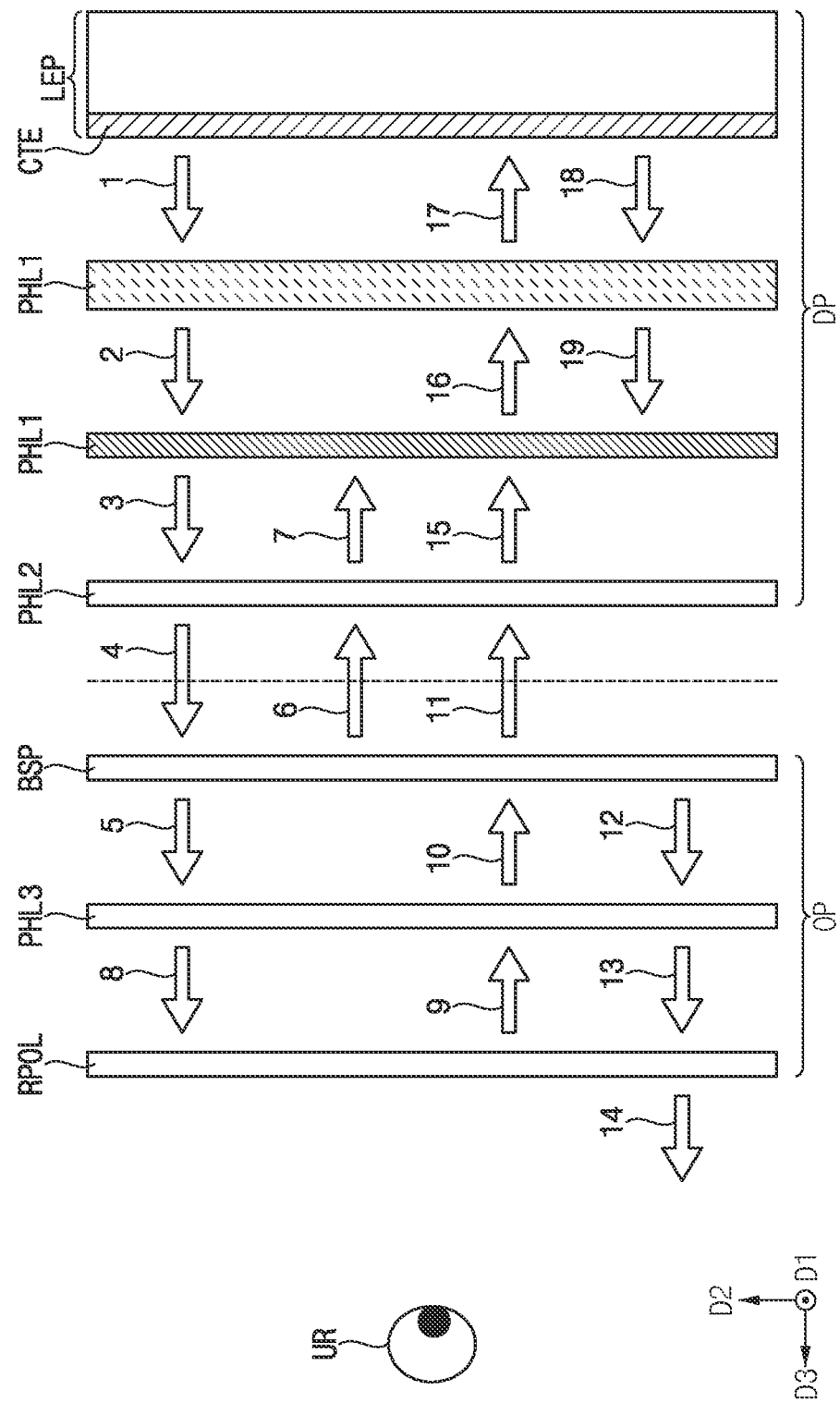
FIG. 3 is a view schematically illustrating a path of light emitted from the display device of FIG. 1.

FIG. 3 is a view schematically illustrating a path of light emitted from the display device of FIG. 1.

Hereinafter, with reference to FIG. 3, a path through which light emitted from the display panel DP of the display device DD reaches the user UR via the optical panel OP will be described in more detail.

In FIG. 3, each layer is illustrated as having a flat structure for convenience of explanation, but in the actual structure, the components of the optical panel OP may have curved surfaces corresponding to FIG. 1.

Additionally, in FIG. 3, for convenience of explanation, only the common electrode CTE of the light-emitting device part LEP is illustrated in detail. The detailed cross-sectional structure of the light-emitting device part LEP will be described in more detail later with reference to FIG. 4.

Referring further to FIG. 3, light emitted from the display panel DP may transmit through the first lens part LSP1 and the second lens part LSP2, respectively, and be provided to the user UR. Light emitted from the display panel DP may be bent (e.g., refracted) by the first lens LS1 and the second lens LS2 and then reach the user UR. Accordingly, the user UR may view an image larger than a size of the display panel DP. Accordingly, a degree to which the user UR is immersed in the image may be improved, and three-dimensional effect of the image may also be improved.

The common electrode CTE of the light-emitting device part LEP may have transflective characteristics. That is, the common electrode CTE may reflect some of the incident light. In an embodiment, the common electrode CTE may reflect about 50% of the incident light, for example. However, the invention is not necessarily limited thereto, and reflectance of the common electrode CTE may vary depending on the embodiments.

The first phase retardation layer PHL1, the absorbing polarizer APOL, and the second phase retardation layer PHL2 may be sequentially disposed on the common electrode CTE along the third direction D3. In an embodiment, the first phase retardation layer PHL1 may be disposed at about 45 degrees with respect to the light absorption axis of the absorbing polarizer APOL.

In FIG. 3, each light is assigned a number, and the characteristics of the light are described according to the number order.

First, referring to first light (refer to 1 in FIG. 3), light emitted from the common electrode CTE of the light-emitting device part LEP in the third direction D3 may have polarization characteristics in all directions.

Referring to second light (refer to 2 in FIG. 3), the first light may transmit through the first phase retardation layer PHL1. Since the second light has polarization characteristics in all directions, the second light has polarization characteristics in all directions even when the first phase retardation layer PHL1 provides a retardation of $\lambda/4$ with respect to the first retardation axis.

Referring to third light (refer to 3 in FIG. 3), the second light may be incident on the absorbing polarizer APOL. Among the second light, linearly polarized light in the same direction as the absorption axis of the absorbing polarizer APOL may be absorbed by the absorbing polarizer APOL, and linearly polarized light perpendicular to the absorption axis may transmit through the absorbing polarizer APOL. That is, the third light may be light that has transmitted through the absorbing polarizer APOL among the second light, and may be linearly polarized light perpendicular to the absorption axis.

Referring to fourth light (refer to 4 in FIG. 3), the third light may be incident on the second phase retardation layer PHL2. When the third light is incident on the second phase retardation layer PHL2, a retardation may be provided only for the second retardation axis, so that linearly polarized light is changed to circularly polarized light and may be transmitted. That is, the fourth light may be light that has transmitted through the second phase retardation layer PHL2 among the third light, and may be circularly polarized light.

Referring to fifth light (refer to 5 in FIG. 3) and sixth light (refer to 6 in FIG. 3), the fourth light may be incident on the beam splitter BSP. When the fourth light is incident on the beam splitter BSP, some of the fourth light may transmit through the beam splitter BSP, and the other of the fourth light may be reflected from the beam splitter BSP. Among the fourth light, light that transmit through the beam splitter BSP is also referred to as the fifth light, and light reflected from the beam splitter BSP is also referred to as the sixth light. At this time, a phase of light-transmitting through the beam splitter BSP does not change, and a phase of light reflected from the beam splitter BSP may be halved by about 180 degrees. That is, the fifth light may be circularly polarized light in the same direction as the fourth light, and the sixth light may be circularly polarized light in an opposite direction to the fourth light.

Referring to seventh light (refer to 7 in FIG. 3), the sixth light may be incident on the second phase retardation layer PHL2. When the sixth light is incident on the second phase retardation layer PHL2, a retardation may be provided only for the second retardation axis, so that circularly polarized light is changed to linearly polarized light and may be transmitted. That is, the seventh light may be light that has transmitted through the second phase retardation layer PHL2 among the sixth light, and may be linearly polarized light.

A linear polarization direction of the seventh light may be opposite to a linear polarization direction of the third light. That is, as the seventh light is light that has transmitted through the second phase retardation layer PHL2 among the sixth light whose phase has been reversed by about 180 degrees by the beam splitter BSP, the linear polarization direction of the seventh light may be opposite to the linear polarization direction of the third light. Accordingly, the linear polarization direction of the seventh light may be the same as the light absorption axis of the absorbing polarizer APOL. Accordingly, the seventh light may be absorbed by the absorbing polarizer APOL. In other words, the seventh light may not transmit through the absorbing polarizer APOL.

As a result, light reflected from the beam splitter BSP among the light incident to the beam splitter BSP from the display panel DP may not be visible to the user UR as being absorbed by the absorbing polarizer APOL and being lost.

In an embodiment, assuming that the absorption axis of the absorbing polarizer APOL is about 0 degree and the second phase retardation layer PHL2 provides retardation only for the retardation axis in the 45 degree-direction, the third light may be linearly polarized light of about 90 degrees, the fourth light may be left-circularly polarized light, the sixth light may be right-circularly polarized light, and the seventh light may be linearly polarized light of about 0 degree, for example. Accordingly, the seventh light may be absorbed by the absorbing polarizer APOL.

Referring to eighth light (refer to 8 in FIG. 3), the fifth light may be incident on the third phase retardation layer PHL3. When the fifth light is incident on the third phase retardation layer PHL3, a retardation may be provided only for the third retardation axis, so that the circularly polarized light may be changed to linearly polarized light and may be transmitted. That is, the eighth light may be light that has transmitted through the third phase retardation layer PHL3 among the fifth light, and may be linearly polarized light.

Referring to ninth light (refer to 9 in FIG. 3), the eighth light may be incident on the reflective polarizer RPOL. Among the eighth light, linearly polarized light in the same direction as the reflection axis of the reflective polarizer RPOL may be reflected from the reflective polarizer RPOL, and linearly polarized light perpendicular to the reflection axis may transmit through the reflective polarizer RPOL. That is, the ninth light may be light reflected from the reflective polarizer RPOL among the eighth light, and may be linearly polarized light in the same direction as the reflection axis.

In an embodiment, assuming the absorption axis of the absorbing polarizer APOL is about 0 degree, the third phase retardation layer PHL3 provides retardation only for the retardation axis in the 45 degree-direction, and the reflection axis of the reflective polarizer RPOL is about 0 degree, the third light may be linearly polarized light of about 90 degrees, the fourth light may be left-circularly polarized light, the fifth light may be left-circularly polarized light, the eighth light may be linearly polarized light of about 0 degree, and the ninth light may be linearly polarized light of 0 degree, for example.

Referring to tenth light (refer to 10 in FIG. 3), the ninth light may be incident on the third phase retardation layer PHL3. When the ninth light is incident on the third phase retardation layer PHL3, a retardation may be provided only for the third retardation axis, so that linearly polarized light may be changed to circularly polarized light and may be transmitted. That is, the tenth light may be light that has transmitted through the third phase retardation layer PHL3 among the ninth light, and may be circularly polarized light.

Referring to eleventh light (refer to 11 in FIG. 3) and twelfth light (refer to 12 in FIG. 3), the tenth light may be incident on the beam splitter BSP. When the tenth light is incident on the beam splitter BSP, some of the tenth light may transmit through the beam splitter BSP, and the other may be reflected from the beam splitter BSP. Among the tenth light, light that transmits through the beam splitter BSP is also referred to as the eleventh light, and light reflected from the beam splitter BSP is also referred to as the twelfth light. At this time, a phase of light-transmitting through the beam splitter BSP does not change, and a phase of light reflected from the beam splitter BSP may be halved by about 180 degrees. That is, the eleventh light may be circularly polarized light in the same direction as tenth light, and the twelfth light may be circularly polarized light in the opposite direction to the tenth light.

Referring to thirteenth light (refer to 13 in FIG. 3), the twelfth light may be incident on the third phase retardation layer PHL3. When the twelfth light is incident on the third phase retardation layer PHL3, a retardation may be provided only for the third retardation axis, so that the circularly polarized light may be changed to linearly polarized light and may be transmitted. That is, the thirteenth light may be light that has transmitted through the third phase retardation layer PHL3 among the twelfth light, and may be linearly polarized light.

At this time, a linear polarization direction of the thirteenth light may be opposite to a linear polarization direction of the eighth light. That is, as the thirteenth light is light that has transmitted through the third phase retardation layer PHL3 among the twelfth light whose phase has been reversed by about 180 degrees by the beam splitter BSP, the linear polarization direction of the thirteenth light may be opposite to the linear polarization direction of the eighth light. Accordingly, the linear polarization direction of the thirteenth light may be perpendicular to the reflection axis of the reflective polarizer RPOL. In other words, the linear polarization direction of the thirteenth light may be the same as the transmission axis of the reflective polarizer RPOL. Therefore, the thirteenth light may transmit through the reflective polarizer RPOL.

In an embodiment, assuming that the third phase retardation layer PHL3 provides retardation only for the retardation axis in the 45-degree direction, and the reflection axis of the reflective polarizer RPOL is 0 degree, the eighth light and the ninth light may be linearly polarized light of 0 degree, the eleventh light may be left-circularly polarized light, the twelfth light may be right-circularly polarized light, and the thirteenth light may be linearly polarized light of about 90 degrees, for example. Accordingly, the thirteenth light may transmit through the reflective polarizer RPOL.

Referring to fourteenth light (refer to 14 in FIG. 3), the fourteenth light may be light that has transmitted through the reflective polarizer RPOL among the thirteenth light, and may be linearly polarized light in a direction perpendicular to the reflection axis. The fourteenth light may be provided to the user UR.

Referring to fifteenth light (refer to 15 in FIG. 3), the eleventh light may be incident on the second phase retardation layer PHL2. When the eleventh light is incident on the second phase retardation layer PHL2, a retardation may be provided only for the second retardation axis, so that the circularly polarized light may be changed to linearly polarized light and may be transmitted. That is, the fifteenth light may be light that has transmitted through the second phase retardation layer PHL2 among the eleventh light, and may be linearly polarized light.

Referring to the sixteenth light (refer to 16 in FIG. 3), the fifteenth light may be incident on the absorbing polarizer APOL. Among the fifteenth light, linearly polarized light in the same direction as the absorption axis of the absorbing polarizer APOL may be absorbed by the absorbing polarizer APOL, and linearly polarized light perpendicular to the absorption axis may transmit through the absorbing polarizer APOL. That is, the sixteenth light may be light that has transmitted through the absorbing polarizer APOL among the fifteenth light, and may be linearly polarized light perpendicular to the absorption axis.

Referring to seventeenth light (refer to 17 in FIG. 3), the sixteenth light may be incident on the first phase retardation layer PHL1. When the sixteenth light is incident on the first phase retardation layer PHL1, a retardation may be provided only for the first retardation axis, so that the linearly polarized light may be changed to circularly polarized light and may be transmitted. That is, the seventeenth light may be light that has transmitted through the first phase retardation layer PHL1 among the sixteenth light, and may be circularly polarized light.

Referring to eighteenth light (refer to 18 in FIG. 3), the seventeenth light may be incident on the common electrode CTE. The common electrode CTE may reflect the seventeenth light. That is, the eighteenth light may be light obtained when the seventeenth light is reflected by the common electrode CTE. At this time, a phase of light may be reversed by about 180 degrees. Therefore, the eighteenth light may be circularly polarized light in the opposite direction to the seventeenth light.

Referring to nineteenth light (refer to 19 in FIG. 3), the eighteenth light may be incident on the first phase retardation layer PHL1. When the eighteenth light is incident on the first phase retardation layer PHL1, a retardation may be provided only for the first retardation axis, so that the circularly polarized light may be changed to linearly polarized light and may be transmitted. That is, the nineteenth light may be light that has transmitted through the first phase retardation layer PHL1 among the eighteenth light, and may be linearly polarized light.

At this time, a linear polarization direction of the nineteenth light may be opposite to a linear polarization direction of the sixteenth light. That is, as the nineteenth light is light that has transmitted through the first phase retardation layer PHL1 among the eighteenth light whose phase has been reversed by about 180 degrees by the common electrode CTE, the linear polarization direction of the nineteenth light may be opposite to the linear polarization direction of the sixteenth light. Accordingly, the linear polarization direction of the nineteenth light may be same as the light absorption axis of the absorbing polarizer APOL. Therefore, the nineteenth light may be absorbed by the absorbing polarizer APOL. In other words, the nineteenth light may not transmit through the absorbing polarizer APOL.

In an embodiment, assuming the absorption axis of the absorbing polarizer APOL is about 0 degree, and the first phase retardation layer PHL1 and the second phase retardation layer provide retardation only for the retardation axis in the 45 degree-direction, the eleventh light may be left-circularly polarized light, the fifteenth light and the sixteenth light may be linearly polarized light of about 90 degrees, the eighteenth light may be left-circularly polarized light, and the nineteenth light may be linearly polarized light of about 0 degree, for example. Therefore, the nineteenth light may be absorbed by the absorbing polarizer APOL.

As a result, light reflected from the common electrode CTE of the display panel DP may not be substantially visible to the user UR as being absorbed by the absorbing polarizer APOL and being lost. Accordingly, an occurrence of virtual images due to reflection of the common electrode CTE may be reduced or prevented.

In particular, since a separate polarizer is not disposed between the first phase retardation layer PHL1 and the absorbing polarizer APOL, the light reflected from the common electrode CTE of the display panel DP may transmit through the first phase retardation layer PHL1 and directly absorbed by the absorbing polarizer APOL. Accordingly, the light reflected from the common electrode CTE of the display panel DP may be more easily lost by the absorbing polarizer APOL.

Figure 4:
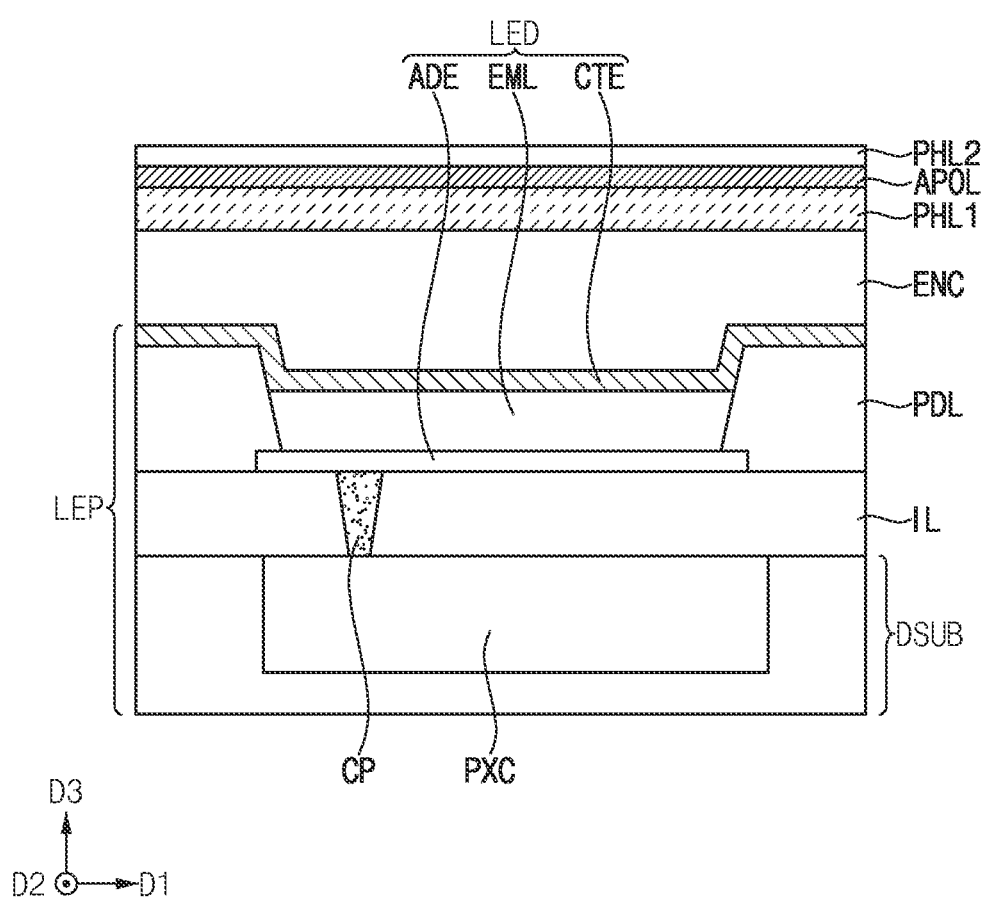
FIG. 4 is a cross-sectional view illustrating a display panel included in the display device of FIG. 1.

FIG. 4 is a cross-sectional view illustrating a display panel included in the display device of FIG. 1.

Hereinafter, with reference to FIG. 4, the cross-sectional structure of the display panel DP will be described in more detail.

Referring to FIG. 4, the display panel DP may include a driving substrate DSUB, an insulating layer IL, a pixel connection pattern CP, a light-emitting device LED, a pixel defining layer PDL, an encapsulation layer ENC, the first phase retardation layer PHL1, the absorbing polarizer APOL, and the second phase retardation layer PHL2. Here, the light-emitting device LED may include a pixel electrode ADE, a light-emitting layer EML, and the common electrode CTE.

In an embodiment, the display panel DP may be an ultra-small light-emitting diode display panel (or a micro light-emitting diode display panel) that includes an ultra-small light-emitting diode (or a micro light-emitting diode) as light-emitting diode. However, the invention is not necessarily limited thereto.

The driving substrate DSUB may be a semiconductor circuit board. In an embodiment, the driving substrate DSUB may have a structure in which a pixel circuit part PXC is disposed on a silicon wafer, for example. That is, the silicon wafer may be a support member for supporting components of the display panel DP. The pixel circuit part PXC may include at least one transistor.

The insulating layer IL may be disposed on the driving substrate DSUB. In an embodiment, the insulating layer IL may define a contact hole penetrating the insulating layer IL. The insulating layer IL may include an organic material. In embodiments, the organic material included in the insulating layer IL may include photoresist, polyacrylic resin, polyimide resin, acrylic resin, or the like. These may be used alone or in any combinations with each other.

The pixel connection pattern CP may be filled in the contact hole. The pixel connection pattern CP may be electrically connected to the pixel circuit part PXC. The pixel connection pattern CP may include a conductive material. In an embodiment, the pixel connection pattern CP may include tungsten (W), for example.

The pixel electrode ADE may be disposed on the insulating layer IL. The pixel electrode ADE may be electrically connected to the pixel circuit part PXC through the pixel connection pattern CP. Accordingly, the pixel electrode ADE may receive voltage from the pixel circuit part PXC. In an embodiment, the pixel electrode ADE may function as an anode, for example.

The pixel defining layer PDL may be disposed on the insulating layer IL and the pixel electrode ADE. The pixel defining layer PDL may expose at least a portion of the pixel electrode ADE.

The light-emitting layer EML may be disposed on the pixel electrode ADE exposed from the pixel defining layer PDL. The light-emitting layer EML may include an organic material that emits light. However, the invention is not necessarily limited thereto.

The common electrode CTE may be disposed on the light-emitting layer EML. The common electrode CTE may include a conductive material. In embodiments, the conductive material used as the common electrode CTE may include lithium, calcium, aluminum, silver, magnesium, or the like. These may be used alone or in any combinations with each other. In an embodiment, the common electrode CTE may function as a cathode, for example.

A structure of the display panel DP illustrated in FIG. 4 is an example and may change in various ways depending on the embodiments.

Figure 5:
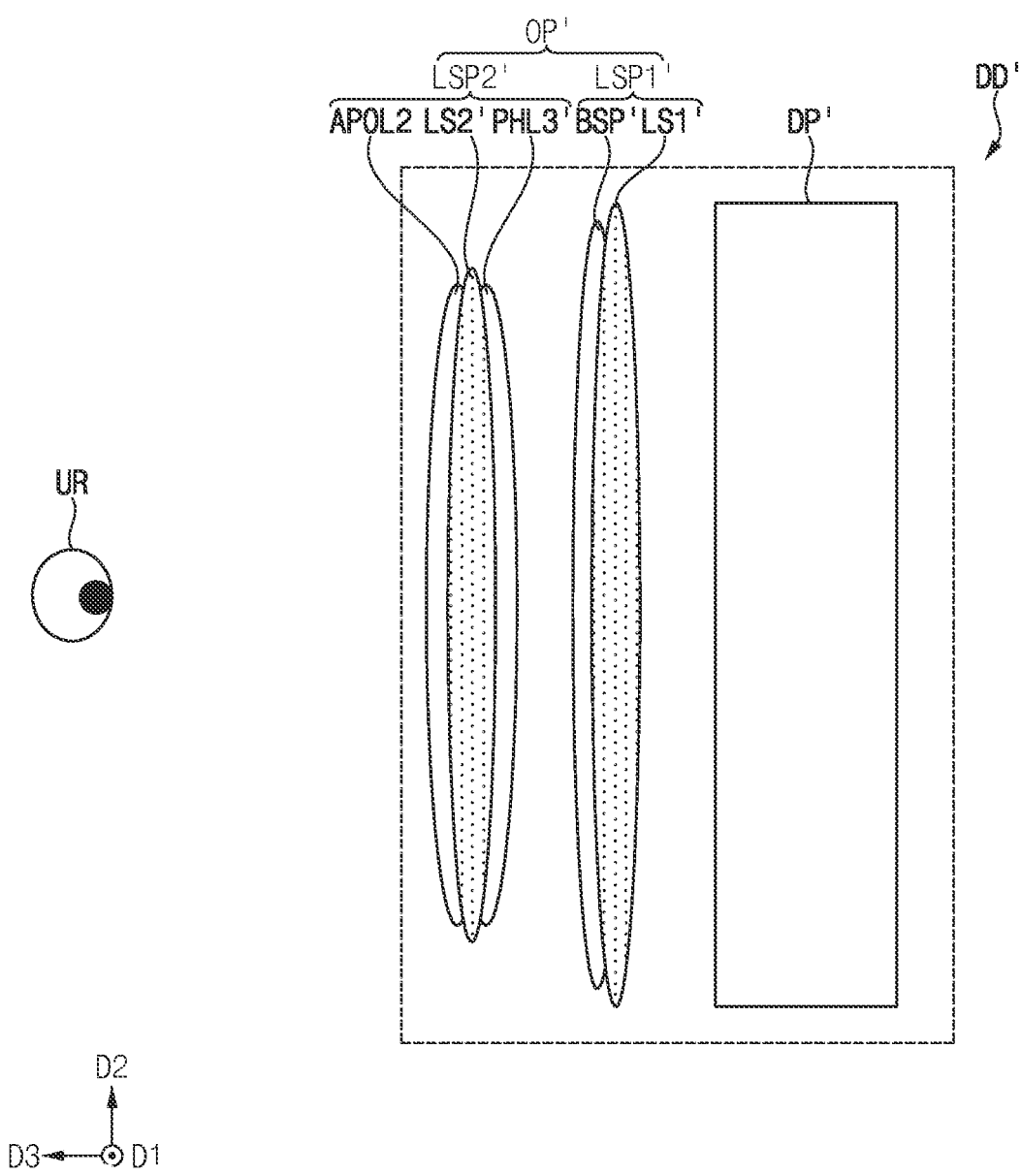
FIG. 5 is a schematic view illustrating another embodiment of a display device.
Figure 6:
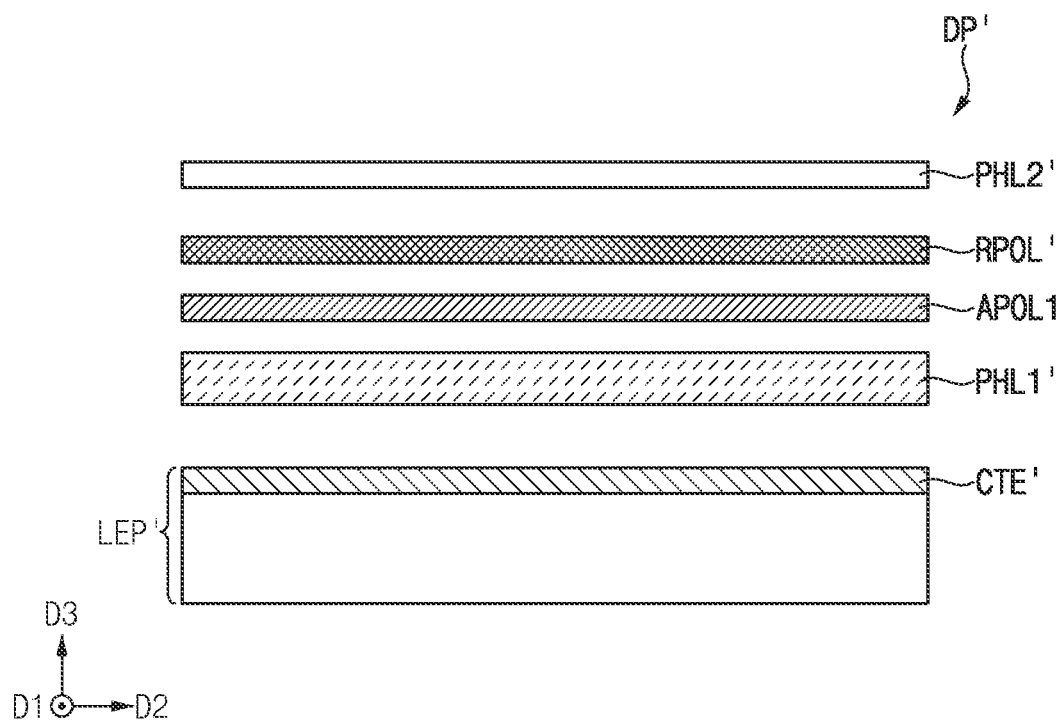
FIG. 6 is a schematic cross-sectional view illustrating a display panel included in the display device of FIG. 5.

FIG. 5 is a schematic view illustrating another embodiment of a display device. FIG. 6 is a schematic cross-sectional view illustrating a display panel included in the display device of FIG. 5.

Referring to FIGS. 5 and 6, a display device DD' may be substantially the same or similar to the display device DD of FIG. 1 and FIG. 2 except that a display panel DP' further includes a reflective polarizer and a second lens part LSP2' includes an absorbing polarizer. Therefore, overlapping descriptions are omitted or simplified.

The display device DD' may include the display panel DP' and an optical panel OP'. The optical panel OP' may be disposed in front of the display panel DP'. In an embodiment, the optical panel OP' may be disposed between the display panel DP' and the user UR (e.g., eyes of the user UR), for example.

FIG. 6 schematically illustrates a light-emitting device part LEP' included in the display panel DP'. The light-emitting device part LEP' may include a plurality of layers of the display panel DP' in which a light-emitting device that emits light and a pixel circuit for driving the light-emitting device are formed. A common electrode CTE' of the light-emitting device may be disposed at the uppermost part of the light-emitting device part LEP'. The detailed cross-sectional structure may be substantially same as the cross-sectional structure of the light-emitting device part LEP described with reference to FIG. 4. Therefore, detailed descriptions are omitted.

A first phase retardation layer PHL1', a first absorbing polarizer APOL1, a reflective polarizer RPOL', a second phase retardation layer PHL2' may be sequentially disposed on the light-emitting device part LEP'. In an embodiment, a separate polarizer may not be disposed between the first phase retardation layer PHL1' and the first absorbing polarizer APOL1. That is, light-transmitting through the first phase retardation layer PHL1' may reach the first absorbing polarizer APOL1 without passing through a separate optical structure.

The first phase retardation layer PHL1' may be substantially same as the first phase retardation layer PHL1 described with reference to FIG. 2, the reflective polarizer RPOL' may be substantially same as the reflective polarizer RPOL described with reference to FIG. 1, and the second phase retardation layer PHL2' may be substantially same as the second phase retardation layer PHL2 described with reference to FIG. 2. Therefore, detailed descriptions are omitted.

That is, the first phase retardation layer PHL1' may have a first retardation axis, the reflective polarizer RPOL' may have a reflection axis, and the second phase retardation layer PHL2' may have a second retardation axis.

The first absorbing polarizer APOL1 may have a first light absorption axis. The first absorbing polarizer APOL1 may absorb linearly polarized light in the same direction as the first absorption axis. That is, linearly polarized light in the same direction as the first absorption axis may not transmit through the first absorbing polarizer APOL1. Additionally, the first absorbing polarizer APOL1 may transmit linearly polarized light perpendicular to the first absorption axis. That is, the first absorbing polarizer APOL1 may have a transmission axis perpendicular to the first absorption axis.

As illustrated in FIG. 5, the optical panel OP' may include a first lens part LSP1' and a second lens part LSP2'. The first lens part LSP1' may be substantially same as the first lens part LSP1 described with reference to FIG. 1. That is, a first lens LS1' of the first lens part LSP1' may be substantially same as the first lens of FIG. 1, and a beam splitter BSP' may be substantially same as the beam splitter BSP of FIG. 1. Therefore, detailed descriptions are omitted.

The second lens part LSP2' may include a second lens LS2', a third phase retardation layer PHL3', and a second absorbing polarizer APOL2. The second lens LS2' may be substantially same as the second lens LS2 described with reference to FIG. 1, and the third phase retardation layer PHL3' may be substantially same as the third phase retardation layer PHL3' described with reference to FIG. 1. Therefore, overlapping descriptions are omitted.

The second absorbing polarizer APOL2 may be disposed on the user UR side of the second lens LS2'. The second absorbing polarizer APOL2 may have a second light absorption axis. The second absorbing polarizer APOL2 may absorb linearly polarized light in the same direction as the second absorption axis. That is, linearly polarized light in the same direction as the second absorption axis may not transmit through the second absorbing polarizer APOL2. Additionally, the second absorbing polarizer APOL2 may transmit linearly polarized light perpendicular to the second absorption axis. That is, the second absorbing polarizer APOL2 may have a transmission axis perpendicular to the second light absorption axis.

In an embodiment, the first light absorption axis of the first absorbing polarizer APOL1, the reflection axis of the reflective polarizer RPOL', and the second light absorption axis of the second absorbing polarizer APOL2 may have the same direction as each other.

Figure 7:
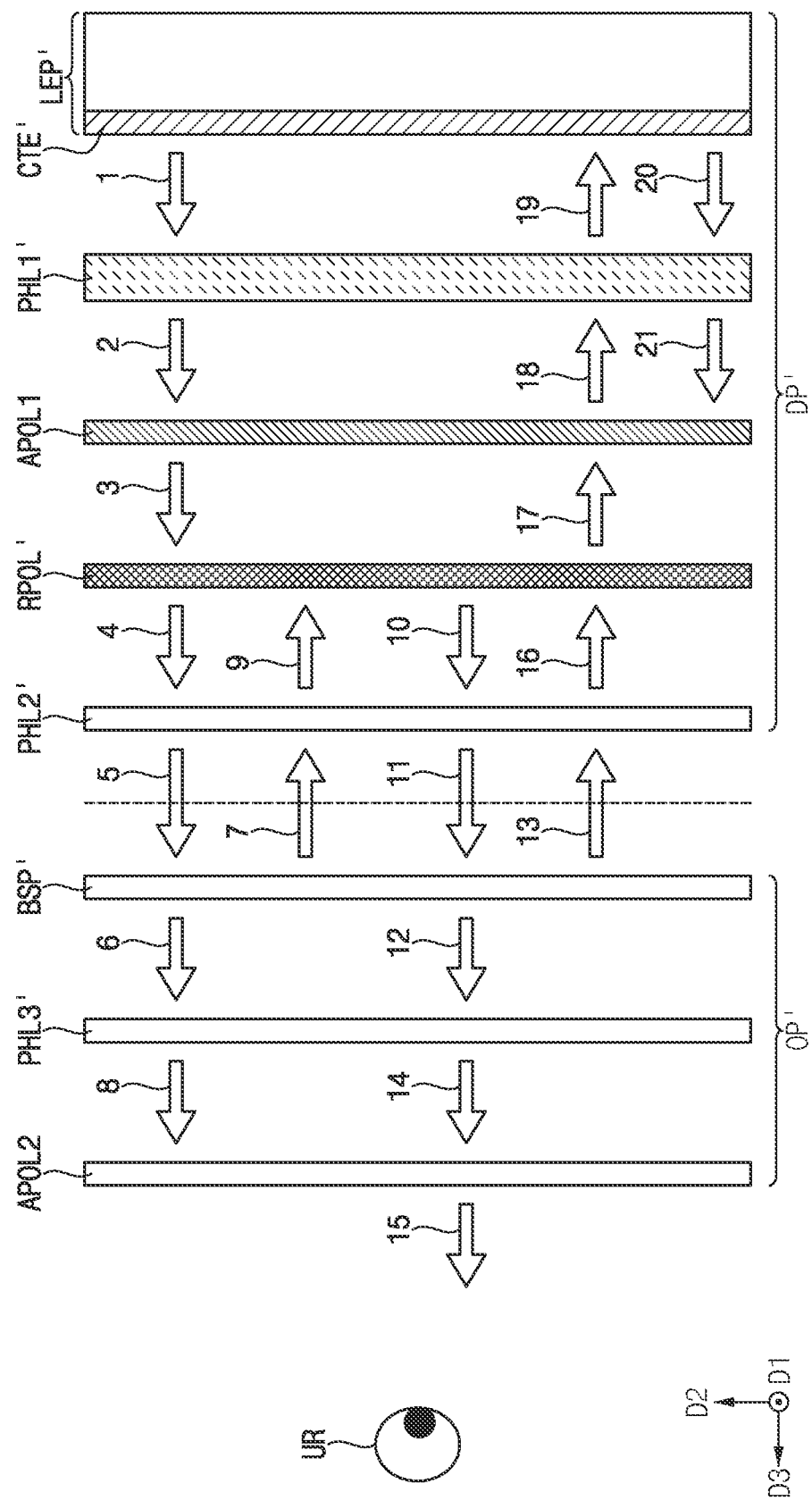
FIG. 7 is a view schematically illustrating a path of light emitted from the display device of FIG. 5.

FIG. 7 is a view schematically illustrating a path of light emitted from the display device of FIG. 5.

Hereinafter, with reference to FIG. 3, a path through which light emitted from the display panel DP' of the display device DD' reaches the user UR via the optical panel OP' will be described in more detail.

In FIG. 7, each layer is illustrated as having a flat structure for convenience of explanation, but in the actual structure, the components of the optical panel OP 'may have curved surfaces corresponding to FIG. 5.

Additionally, in FIG. 7, for convenience of explanation, only the common electrode CTE' of the light-emitting device part LEP' is illustrated in detail.

Referring further to FIG. 7, light emitted from the display panel DP' may transmit through the first lens part LSP1' and the second lens part LSP2', respectively, and be provided to the user UR. Light emitted from the display panel DP' may be bent (e.g., refracted) by the first lens LS1' and the second lens LS2' and then reach the user UR. Accordingly, the user UR may view an image larger than a size of the display panel DP'. Accordingly, a degree to which the user UR is immersed in the image may be improved, and three-dimensional effect of the image may also be improved.

The common electrode CTE' of the light-emitting device part LEP' may have transflective characteristics. That is, the common electrode CTE' may reflect some of the incident light. In an embodiment, the common electrode CTE' may reflect about 50% of the incident light, for example. However, the invention is not necessarily limited thereto, and reflectance of the common electrode CTE' may vary depending on the embodiments.

The first phase retardation layer PHL1', the first absorbing polarizer APOL1, the reflective polarizer RPOL', and the second phase retardation layer PHL2' may be sequentially disposed on the common electrode CTE' along the third direction D3. In an embodiment, the first phase retardation layer PHL1' may be disposed at about 45 degrees with respect to the first light absorption axis of the first absorbing polarizer APOL1.

In FIG. 7, each light is assigned a number, and the characteristics of the light are described according to the number order.

First, referring to first light (refer to 1 in FIG. 7), light emitted from the common electrode CTE' of the light-emitting device part LEP' in the third direction D3 may have polarization characteristics in all directions.

Referring to second light (refer to 2 in FIG. 7), the first light may transmit through the first phase retardation layer PHL1'. Since the second light has polarization characteristics in all directions, the second light has polarization characteristics in all directions even when the first phase retardation layer PHL1' provides a retardation of λ/4 with respect to the first retardation axis.

Referring to third light (refer to 3 in FIG. 7), the second light may be incident on the first absorbing polarizer APOL1. Among the second light, linearly polarized light in the same direction as the first absorption axis of the first absorbing polarizer APOL1 may be absorbed by the first absorbing polarizer APOL1, and linearly polarized light perpendicular to the first absorption axis may transmit through the first absorbing polarizer APOL1. That is, the third light may be light that has transmitted through the first absorbing polarizer APOL1 among the second light, and may be linearly polarized light perpendicular to the first absorption axis.

Referring to fourth light (refer to 4 in FIG. 7), the third light may be incident on the reflective polarizer RPOL'. Among the third light, linearly polarized light in the same direction as the reflection axis of the reflective polarizer RPOL' may be reflected from the reflective polarizer RPOL', and linearly polarized light perpendicular to the reflection axis may transmit through the reflective polarizer RPOL'. That is, the fourth light may be light that has transmitted through the reflective polarizer RPOL' among the third light, and may be linearly polarized light perpendicular to the reflection axis.

Referring to fifth light (refer to 5 in FIG. 7), the fourth light may be incident on the second phase retardation layer PHL2'. When the fourth light is incident on the second phase retardation layer PHL2', a retardation may be provided only for the second retardation axis, so that linearly polarized light is changed to circularly polarized light and may be transmitted. That is, the fifth light may be light that has transmitted through the second phase retardation layer PHL2' among the fourth light, and may be circularly polarized light.

Referring to sixth light (refer to 6 in FIG. 7) and seventh light (refer to 7 in FIG. 7), the fifth light may be incident on the beam splitter BSP'. When the fifth light is incident on the beam splitter BSP', some of the fifth light may transmit through the beam splitter BSP', and the other of the fifth light may be reflected from the beam splitter BSP'. Among the fifth light, light that transmit through the beam splitter BSP' is also referred to as the sixth light, and light reflected from the beam splitter BSP' is also referred to as the seventh light. At this time, a phase of light-transmitting through the beam splitter BSP' does not change, and a phase of light reflected from the beam splitter BSP' may be halved by about 180 degrees. That is, the sixth light may be circularly polarized light in the same direction as the fifth light, and the seventh light may be circularly polarized light in an opposite direction to the fifth light.

Referring to eighth light (refer to 8 in FIG. 7), the sixth light may be incident on the third phase retardation layer PHL3'. When the sixth light is incident on the third phase retardation layer PHL3', a retardation may be provided only for the third retardation axis, so that circularly polarized light is changed to linearly polarized light and may be transmitted. That is, the eighth light may be light that has transmitted through the third phase retardation layer PHL3' among the sixth light, and may be linearly polarized light.

At this time, a linear polarization direction of the eighth light may be opposite to a linear polarization direction of the third light. That is, since the eighth light is light that is obtained as the third light transmits through the second phase retardation layer PHL2' and the third phase retardation layer PHL3' sequentially, the linear polarization direction of the eighth light may be opposite to the linear polarization direction of the third light. Accordingly, the linear polarization direction of the eighth light may be the same as the light absorption axis of the second absorbing polarizer APOL2. Accordingly, the eighth light may be absorbed by the second absorbing polarizer APOL2. In other words, the eighth light may not transmit through the second absorbing polarizer APOL2.

In an embodiment, assuming that the first absorption axis of the first absorbing polarizer APOL1, the reflection axis of the reflective polarizer RPOL', and the second absorption axis of the second absorbing polarizer APOL2 are about 0 degree, and each of the second phase retardation layer PHL2' and the third phase retardation layer PHL3' provides retardation only for the retardation axis in the 45-degree direction, the third light and the fourth light may be linearly polarized light of about 90 degrees, the fifth light and the sixth light may be left-circularly polarized light, and the eighth light may be linearly polarized light of about 0 degree, for example. Therefore, the eighth light may not transmit through the second absorbing polarizer APOL2.

Referring to ninth light (refer to 9 in FIG. 7), the seventh light may be incident on the second phase retardation layer PHL2'. When the seventh light is incident on the second phase retardation layer PHL2', a retardation may be provided only for the second retardation axis, so that circularly polarized light is changed to linearly polarized light and may be transmitted. That is, the ninth light may be light that has transmitted through the second phase retardation layer PHL2' among the seventh light, and may be linearly polarized light.

Referring to tenth light (refer to 10 in FIG. 7), the ninth light may be incident on the reflective polarizer RPOL'. Among the ninth light, linearly polarized light in the same direction as the reflection axis of the reflective polarizer RPOL' may be reflected from the reflective polarizer RPOL', and linearly polarized light perpendicular to the reflection axis may transmit through the reflective polarizer RPOL'. That is, the tenth light may be light that has transmitted through the reflective polarizer RPOL' among the ninth light, and may be linearly polarized light perpendicular to the reflection axis.

In an embodiment, assuming that the first absorption axis of the first absorbing polarizer APOL1 and the reflection axis of the reflective polarizer RPOL' are about 0 degree, and the second phase retardation layer PHL2' provides retardation only for the retardation axis in the 45-degree direction, the third light and the fourth light may be linearly polarized light of about 90 degrees, the fifth light and the sixth light may be left-circularly polarized light, the seventh light may be right-circularly polarized light, the ninth light may be linearly polarized light of about 0 degree, and the tenth light may be linearly polarized light of about 0 degree, for example.

Referring to eleventh light (refer to 11 in FIG. 7), the tenth light may be incident on the second phase retardation layer PHL2'. When the tenth light is incident on the second phase retardation layer PHL2', a retardation may be provided only for the second retardation axis, so that linearly polarized light is changed to circularly polarized light and may be transmitted. That is, the eleventh light may be light that has transmitted through the second phase retardation layer PHL2' among the tenth light, and may be circularly polarized light.

Referring to twelfth light (refer to 12 in FIG. 7) and thirteenth light (refer to 13 in FIG. 7), the eleventh light may be incident on the beam splitter BSP'. When the eleventh light is incident on the beam splitter BSP', some of the eleventh light may transmit through the beam splitter BSP', and the other may be reflected from the beam splitter BSP'. Among the eleventh light, light that transmits through the beam splitter BSP' is also referred to as the twelfth light, and light reflected from the beam splitter BSP' is also referred to as the thirteenth light. At this time, a phase of light-transmitting through the beam splitter BSP' does not change, and a phase of light reflected from the beam splitter BSP' may be halved by about 180 degrees. That is, the twelfth light may be circularly polarized light in the same direction as eleventh light, and the thirteenth light may be circularly polarized light in the opposite direction to the eleventh light.

Referring to fourteenth light (refer to 14 in FIG. 7), the twelfth light may be incident on the third phase retardation layer PHL3'. When the twelfth light is incident on the third phase retardation layer PHL3', a retardation may be provided only for the third retardation axis, so that the circularly polarized light may be changed to linearly polarized light and may be transmitted. That is, the fourteenth light may be light that has transmitted through the third phase retardation layer PHL3' among the twelfth light, and may be linearly polarized light.

At this time, a linear polarization direction of the fourteenth light may be opposite to a linear polarization direction of the eighth light. Accordingly, the linear polarization direction of the fourteenth light may be perpendicular to the second absorption axis of the second absorbing polarizer APOL2. In other words, the linear polarization direction of the fourteenth light may be the same as the transmission axis of the second absorbing polarizer APOL2. Accordingly, the fourteenth light may transmit through the second absorbing polarizer APOL2.

In an embodiment, assuming that the second absorption axis of the second absorbing polarizer APOL2 is about 0 degree, the eighth light may be linearly polarized light of about 0 degree, the fourteenth light may be left-circularly polarized light. Accordingly, the fourteenth light may transmit through the second absorbing polarizer APOL2, for example.

Referring to fifteenth light (refer to 15 in FIG. 7), the fifteenth light may be light that has transmitted through the second absorbing polarizer APOL2 among the fourteenth light, and may be linearly polarized light in a direction perpendicular to the second absorption axis. The fifteenth light may be provided to the user UR.

Referring to sixteenth light (refer to 16 in FIG. 7), the thirteenth light may be incident on the second phase retardation layer PHL2'. When the thirteenth light is incident on the second phase retardation layer PHL2', a retardation may be provided only for the second retardation axis, so that the circularly polarized light may be changed to linearly polarized light and may be transmitted. That is, the sixteenth light may be light that has transmitted through the second phase retardation layer PHL2' among the thirteenth light, and may be linearly polarized light.

Referring to the seventeenth light (refer to 17 in FIG. 7), the sixteenth light may be incident on the reflective polarizer RPOL'. Among the sixteenth light, linearly polarized light in the same direction as the reflection axis of the reflective polarizer RPOL' may be reflected from the reflective polarizer RPOL', and linearly polarized light perpendicular to the reflection axis may transmit through the reflective polarizer RPOL'. That is, the seventeenth light may be light that has transmitted through the reflective polarizer RPOL' among the sixteenth light, and may be linearly polarized light perpendicular to the reflection axis.

Referring to the eighteenth light (refer to 18 in FIG. 7), the seventeenth light may be incident on the first absorbing polarizer APOL1. Among the seventeenth light, linearly polarized light in the same direction as the first absorption axis of the first absorbing polarizer APOL1 may be absorbed by the first absorbing polarizer APOL1, and linearly polarized light perpendicular to the first absorption axis may transmit through the first absorbing polarizer APOL1. That is, the eighteenth light may be light that has transmitted through the first absorbing polarizer APOL1 among the seventeenth light, and may be linearly polarized light perpendicular to the first absorption axis.

In an embodiment, assuming that the reflection axis of the reflective polarizer RPOL' and the first absorption axis of the first absorbing polarizer APOL1 are about 0 degree, the sixteenth light and the seventeenth light may be linearly polarized light of about 90 degrees, for example. Accordingly, the sixteenth light may transmit through the reflective polarizer RPOL', and the seventeenth light may transmit through the first absorbing polarizer APOL1. Therefore, the eighteenth light may be linearly polarized light of about 90 degrees.

Referring to nineteenth light (refer to 19 in FIG. 7), the eighteenth light may be incident on the first phase retardation layer PHL1'. When the eighteenth light is incident on the first phase retardation layer PHL1', a retardation may be provided only for the first retardation axis, so that the linearly polarized light may be changed to circularly polarized light and may be transmitted. That is, the nineteenth light may be light that has transmitted through the first phase retardation layer PHL1' among the eighteenth light, and may be circularly polarized light.

Referring to twentieth light (refer to 20 in FIG. 7), the nineteenth light may be incident on the common electrode CTE'. The common electrode CTE' may reflect the nineteenth light. That is, the twentieth light may be light obtained when the nineteenth light is reflected by the common electrode CTE'. At this time, a phase of light may be reversed by about 180 degrees. Therefore, the twentieth light may be circularly polarized light in the opposite direction to the nineteenth light.

Referring to twenty-first light (refer to 21 in FIG. 7), the twentieth light may be incident on the first phase retardation layer PHL1'. When the twentieth light is incident on the first phase retardation layer PHL1', a retardation may be provided only for the first retardation axis, so that the circularly polarized light may be changed to linearly polarized light and may be transmitted. That is, the twenty-first light may be light that has transmitted through the first phase retardation layer PHL1' among the twentieth light, and may be linearly polarized light.

A linear polarization direction of the twenty-first light may be opposite to a linear polarization direction of the eighteenth light. That is, as the twenty-first light is light that has transmitted through the first phase retardation layer PHL1' among the twentieth light whose phase has been reversed by about 180 degrees by the common electrode CTE', the linear polarization direction of the twenty-first light may be opposite to the linear polarization direction of the eighteenth light. Accordingly, the linear polarization direction of the twenty-first light may be same as the first light absorption axis of the first absorbing polarizer APOL1. Therefore, the twenty-first light may be absorbed by the first absorbing polarizer APOL1. In other words, the twenty-first light may not transmit through the first absorbing polarizer APOL1.

In an embodiment, assuming the first absorption axis of the first absorbing polarizer APOL1 is about 0 degree, and the first phase retardation layer PHL1' provides retardation only for the retardation axis in the 45 degree-direction, the seventeenth light and the eighteenth light may be linearly polarized light of about 90 degrees, the nineteenth light may be right-circularly polarized light, the twentieth light may be left-circularly polarized light, and the twenty-first light may be linearly polarized light of about 0 degree. Therefore, the twenty-first light may be absorbed by the first absorbing polarizer APOL1, for example.

As a result, light reflected from the common electrode CTE' of the display panel DP' may not be substantially visible to the user UR as being absorbed by the first absorbing polarizer APOL1 and being lost. Accordingly, an occurrence of virtual images due to reflection of the common electrode CTE' may be reduced or prevented.

In particular, since a separate polarizer is not disposed between the first phase retardation layer PHL1' and the first absorbing polarizer APOL1, the light reflected from the common electrode CTE' of the display panel DP' may transmit through the first phase retardation layer PHL1' and directly absorbed by the first absorbing polarizer APOL1. Accordingly, the light reflected from the common electrode CTE' of the display panel DP' may be more easily lost by the first absorbing polarizer APOL1.

Figure 8:
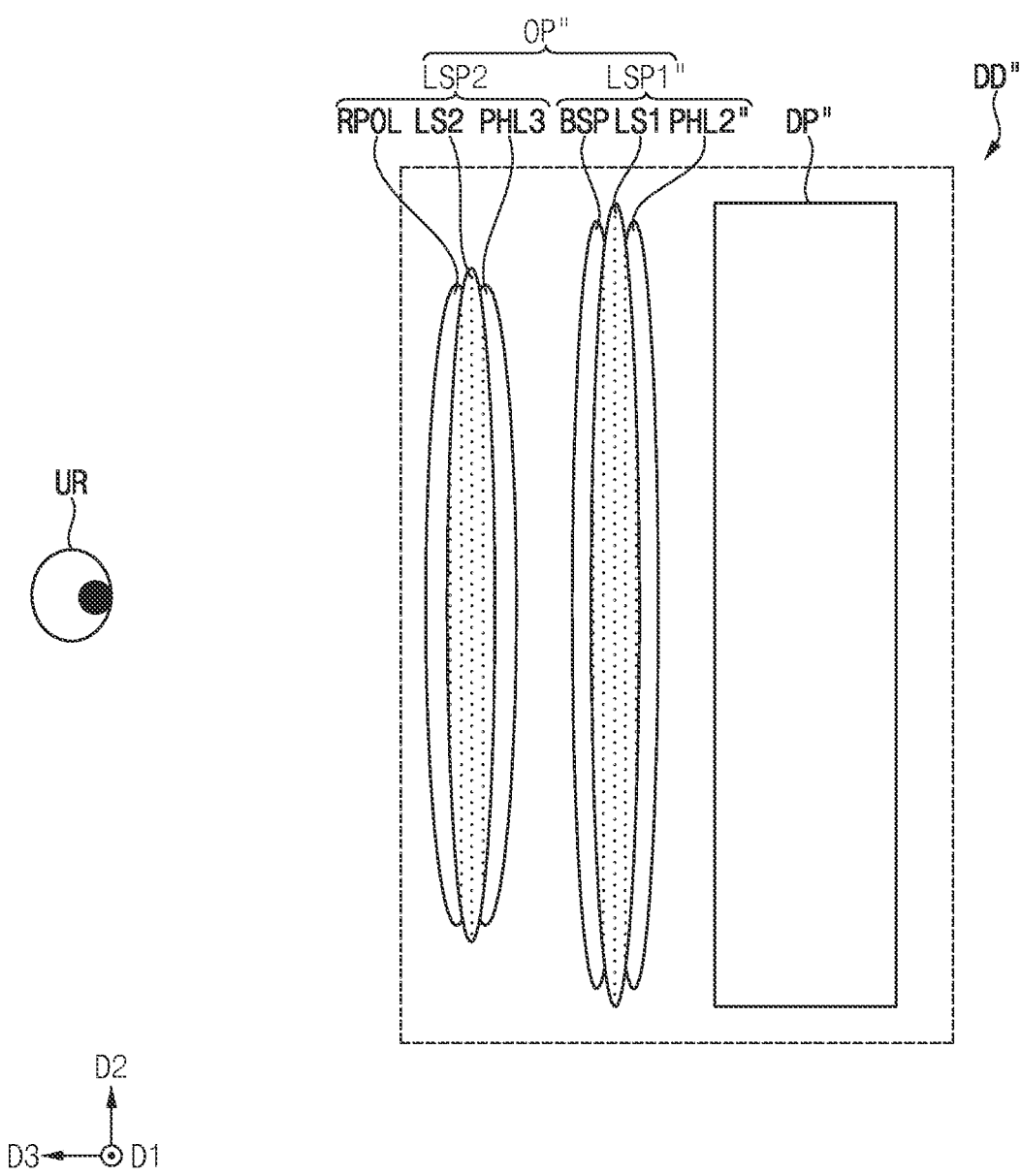
FIG. 8 is a schematic view illustrating another embodiment of a display device.
Figure 9:
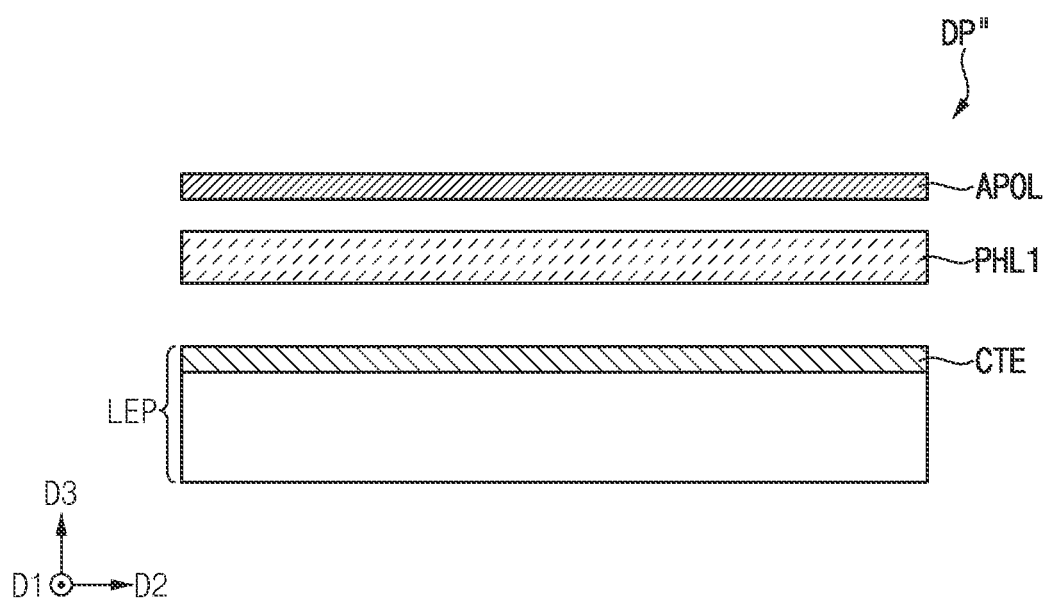
FIG. 9 is a schematic cross-sectional view illustrating a display panel included in the display device of FIG. 8.

FIG. 8 is a schematic view illustrating another embodiment of a display device. FIG. 9 is a schematic cross-sectional view illustrating a display panel included in the display device of FIG. 8.

Referring to FIGS. 8 and 9, the display device DD" may be substantially same as or similar to the display device DD described with reference to FIGS. 1 and 2 except that the second phase retardation layer is omitted in a display panel DP''', and a first lens part LSP1" has a second phase retardation layer. Therefore, overlapping descriptions are omitted or simplified.

The display device DD" may include the display panel DP''' and an optical panel OP'''. The optical panel OP''' may be disposed in front of the display panel DP'''. In an embodiment, the optical panel OP''' may be disposed between the display panel DP''' and the user UR (e.g., eyes of the user UR), for example.

As illustrated in FIG. 8, the optical panel OP''' may include the first lens part LSP1" and a second lens part LSP2. Descriptions of the second lens part LSP2 is omitted since it overlaps with the descriptions described with reference to FIG. 1. In addition, the first lens part LSP1" may be substantially same as the first lens part LSP1 described with reference to FIG. 1 except for further including a second phase retardation layer PHL2". Therefore, overlapping descriptions are omitted.

The second phase retardation layer PHL2" may be disposed on the display panel DP''' side of the first lens LS1. The second phase retardation layer PHL2" may be substantially same as the second phase retardation layer PHL2 described with reference to FIG. 2. Therefore, detailed descriptions are omitted.

As illustrated in FIG. 9, when the first lens part LSP1" includes the second phase retardation layer PHL2", The second phase retardation layer (refer to PHL2 in FIG. 2) may be omitted in the display panel DP'''. Accordingly, the display panel DP''' included in the display device DD" may have a more simplified structure.

Figure 10:
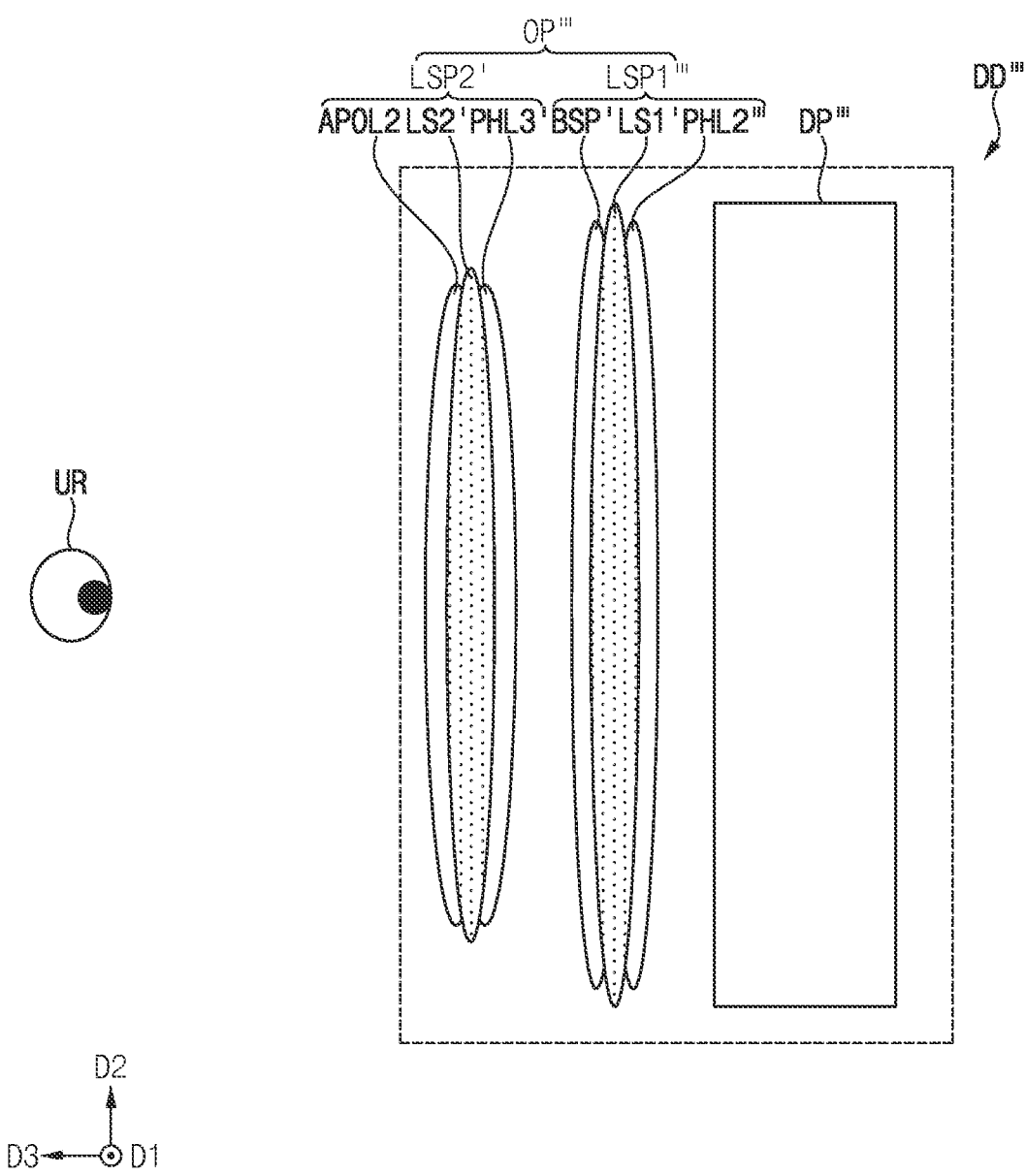
FIG. 10 is a schematic view illustrating another embodiment of a display device.
Figure 11:
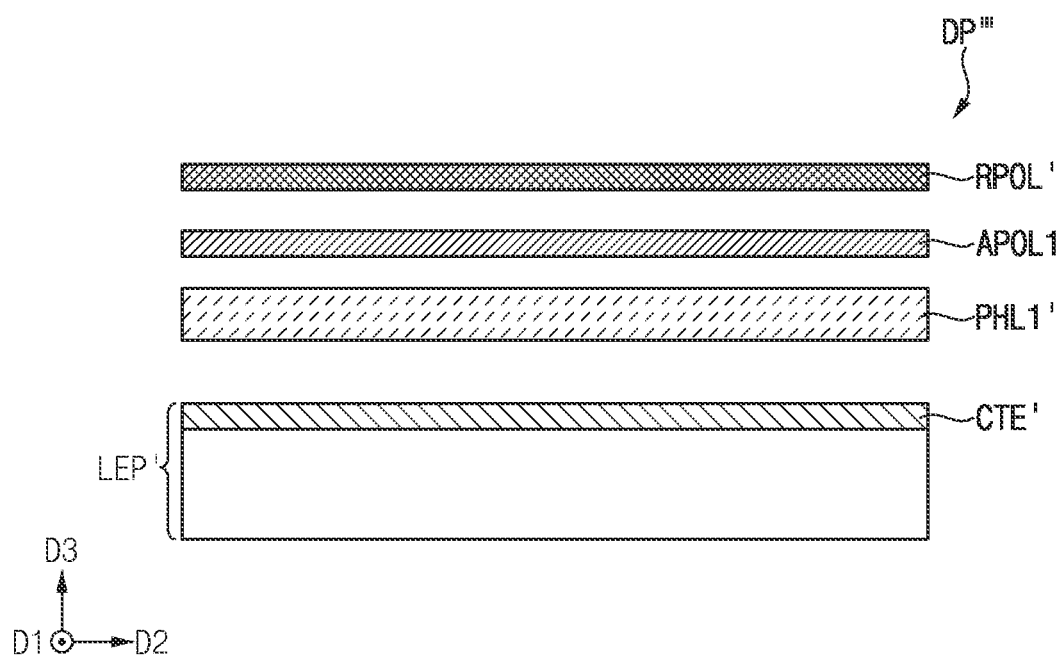
FIG. 11 is a schematic cross-sectional view illustrating a display panel included in the display device of FIG. 8.

FIG. 10 is a schematic view illustrating another embodiment of a display device. FIG. 11 is a schematic cross-sectional view illustrating a display panel included in the display device of FIG. 8.

Referring to FIGS. 10 and 11, the display device DD''' may be substantially same as or similar to the display device DD' described with reference to FIGS. 5 and 6 except that the second phase retardation layer is omitted in a display panel DP''', and a first lens part LSP1''' has a second phase retardation layer. Therefore, overlapping descriptions are omitted or simplified.

The display device DD''' may include the display panel DP'''' and an optical panel OP'''. The optical panel OP''' may be disposed in front of the display panel DP'''. In an embodiment, the optical panel OP''' may be disposed between the display panel DP''' and the user UR (e.g., eyes of the user UR), for example.

As illustrated in FIG. 10, the optical panel OP''' may include the first lens part LSP1''' and a second lens part LSP2'. Descriptions of the second lens part LSP2' is omitted since it overlaps with the descriptions described with reference to FIG. 5. In addition, the first lens part LSP1''' may be substantially same as the first lens part LSP1' described with reference to FIG. 5 except for further including a second phase retardation layer PHL2''. Therefore, overlapping descriptions are omitted.

The second phase retardation layer PHL2''' may be disposed on the display panel DP''' side of the first lens LS1'. The second phase retardation layer PHL2'' may be substantially same as the second phase retardation layer PHL2' described with reference to FIG. 6. Therefore, detailed descriptions are omitted.

As illustrated in FIG. 11, when the first lens part LSP1''' includes the second phase retardation layer PHL2''', The second phase retardation layer (refer to PHL2' in FIG. 6) may be omitted in the display panel DP'''. Accordingly, the display panel DP''' included in the display device DD''' may have a more simplified structure.

A display device in embodiments may include a display panel and an optical panel disposed in front of the display panel, and light emitted from the display panel may be bent (e.g., refracted) by lens included in the optical panel and then reach the user UR. Accordingly, the user UR may view an image larger than a size of the display panel. Accordingly, a degree to which the user UR is immersed in the image may be improved, and three-dimensional effect of the image may also be improved.

Additionally, the display panel may have a structure in which a light-emitting device part, a phase retardation layer having reverse wavelength dispersion characteristics, and an absorbing polarizer are sequentially stacked. Accordingly, light reflected from a common electrode of the display panel may be absorbed by the absorbing polarizer and be lost. Accordingly, light reflected from the common electrode of the display panel may not be substantially visible to the user UR. Accordingly, an occurrence of virtual images due to reflection of the common electrode may be reduced or prevented.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
   a display panel including:
   a light-emitting device part including a light-emitting device;
   a first phase retardation layer disposed on the light-emitting device part and having reverse wavelength dispersion characteristics; and
   an absorbing polarizer disposed on the first phase retardation layer; and
   an optical panel disposed on the display panel, the optical panel including:
   a first lens part disposed on the display panel and including a beam splitter; and
   a second lens part disposed on the first lens part and including a reflective polarizer.

2. The display device of claim 1, wherein the first phase retardation layer includes at least one of a reverse wavelength dispersion film and a reverse wavelength dispersion liquid crystal.

3. The display device of claim 2, wherein the reverse wavelength dispersion film included in the first phase retardation layer is a film in which a first polymer having positive birefringence and a second polymer having negative birefringence are mixed.

4. The display device of claim 2, wherein the reverse wavelength dispersion liquid crystal included in the first phase retardation layer is a liquid crystal in which a normal dispersion mesogen and an inverse dispersion mesogen are mixed.

5. The display device of claim 1, wherein the first phase retardation layer has a structure in which two or more phase retardation layers having different retardation axes are sequentially stacked.

6. The display device of claim 1, wherein the absorbing polarizer of the display panel has a light absorption axis, absorbs polarized light of the light absorption axis, and transmits polarized light perpendicular to the light absorption axis, and
   the reflective polarizer of the second lens part has a reflection axis, reflects polarized light of the reflection axis, and transmits polarized light perpendicular to the reflection axis.

7. The display device of claim 6, wherein the light absorption axis and the reflection axis have a same direction as each other.

8. The display device of claim 1, wherein the first phase retardation layer has a first retardation axis, retardates light in a direction of the first retardation axis by $\lambda/4$ and changes linearly polarized light to circularly polarized light or changes circularly polarized light to linearly polarized light.

9. The display device of claim 1, wherein the display panel further includes:
   a second phase retardation layer disposed on the absorbing polarizer, having a second retardation axis, retardates light in a direction of the second retardation axis by $\lambda/4$ and changes linearly polarized light to circularly polarized light or changes circularly polarized light to linearly polarized light.

10. The display device of claim 1, wherein the light-emitting device includes a pixel electrode, a light-emitting layer disposed on the pixel electrode, and a common electrode disposed on the light-emitting layer,
    the common electrode reflects some of an incident light, and
    a light reflected from the common electrode transmits through the first phase retardation layer and is absorbed by the absorbing polarizer.

11. The display device of claim 1, wherein a separate polarizer is not disposed between the first phase retardation layer and the absorbing polarizer.

12. A display device comprising:
a display panel including:
   a light-emitting device part including a light-emitting device;
   a first phase retardation layer disposed on the light-emitting device part and having reverse wavelength dispersion characteristics;
   a first absorbing polarizer disposed on the first phase retardation layer; and
   a reflective polarizer disposed on the first absorbing polarizer; and
an optical panel disposed on the display panel, the optical panel including:
   a first lens part disposed on the display panel and including a beam splitter; and
   a second lens part disposed on the first lens part and including a second absorbing polarizer.

13. The display device of claim 12, wherein the first phase retardation layer includes at least one of a reverse wavelength dispersion film and a reverse wavelength dispersion liquid crystal.

14. The display device of claim 13, wherein the reverse wavelength dispersion film included in the first phase retardation layer is a film in which a first polymer having positive birefringence and a second polymer having negative birefringence are mixed.

15. The display device of claim 13, wherein the reverse wavelength dispersion liquid crystal included in the first phase retardation layer is a liquid crystal in which a normal dispersion mesogen and an inverse dispersion mesogen are mixed.

16. The display device of claim 12, wherein the first phase retardation layer has a structure in which two or more phase retardation layers having different retardation axes are sequentially stacked.

17. The display device of claim 12, wherein the first absorbing polarizer of the display panel has a first light absorption axis, absorbs polarized light of the first light absorption axis, and transmits polarized light perpendicular to the first light absorption axis, the reflective polarizer of the display panel has a reflection axis, reflects polarized light of the reflection axis, and transmits polarized light perpendicular to the reflection axis, and the second absorbing polarizer of the second lens part has a second light absorption axis, absorbs polarized light of the second light absorption axis, and transmits polarized light perpendicular to the second light absorption axis.

18. The display device of claim 17, wherein the first light absorption axis, the reflection axis, and the second light absorption axis have a same direction as each other.

19. The display device of claim 12, wherein the first phase retardation layer has a first retardation axis, retardates light in a direction of the first retardation axis by $\lambda/4$ and changes linearly polarized light to circularly polarized light or change circularly polarized light to linearly polarized light.

20. The display device of claim 12, wherein the display panel further includes:
a second phase retardation layer disposed on the first absorbing polarizer, having a second retardation axis, retardates light in a direction of the second retardation axis by $\lambda/4$ and changes linearly polarized light to circularly polarized light or changes circularly polarized light to linearly polarized light.

21. The display device of claim 12, wherein the light-emitting device includes a pixel electrode, a light-emitting layer disposed on the pixel electrode, and a common electrode disposed on the light-emitting layer, the common electrode reflects some of an incident light, and a light reflected from the common electrode transmits through the first phase retardation layer and is absorbed by the first absorbing polarizer.

22. The display device of claim 12, wherein the light-emitting device part, the first phase retardation layer, the first absorbing polarizer, and the reflective polarizer are sequentially stacked.

23. The display device of claim 12, wherein a separate polarizer is not disposed between the first phase retardation layer and the first absorbing polarizer.

* * * * *